March 11, 1952 C. D. LAIDLEY 2,589,095
VAPOR CONTROL SYSTEM FOR STORAGE TANKS
Filed Oct. 20, 1949 2 SHEETS—SHEET 1
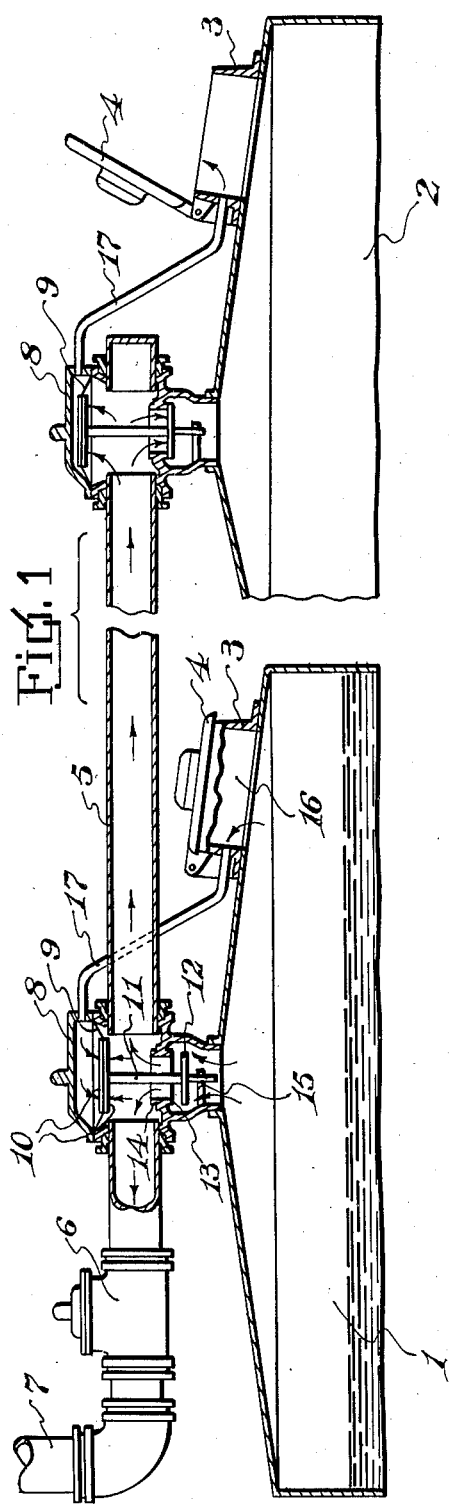
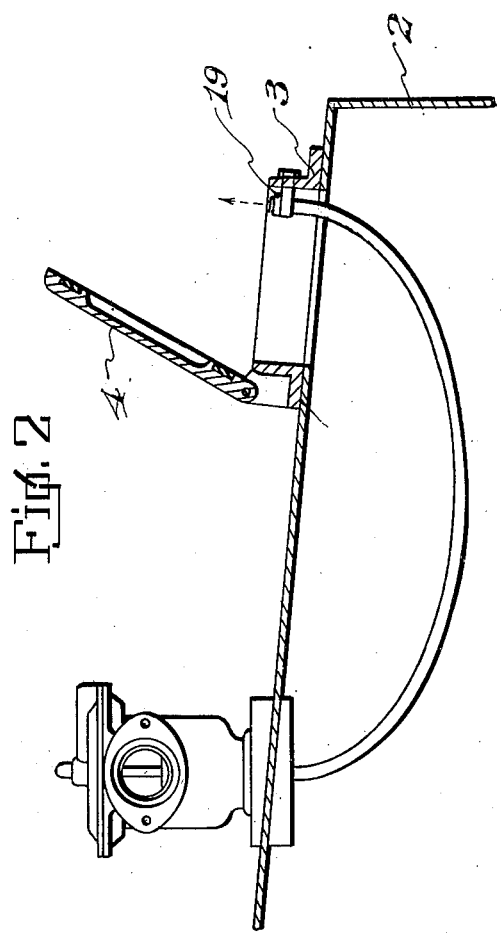
Clarence D. Laidley
INVENTOR.

March 11, 1952  C. D. LAIDLEY  2,589,095
VAPOR CONTROL SYSTEM FOR STORAGE TANKS
Filed Oct. 20, 1949  2 SHEETS—SHEET 2
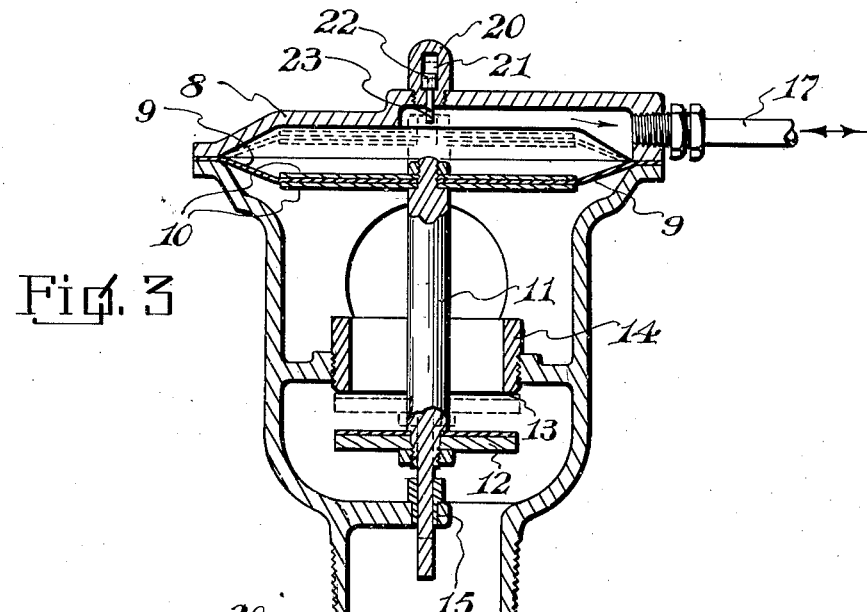
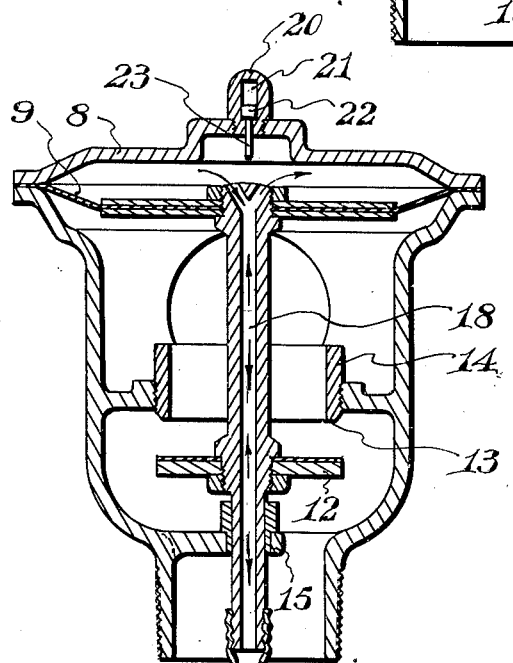
Clarence D. Laidley
INVENTOR.

Patented Mar. 11, 1952

2,589,095

UNITED STATES PATENT OFFICE 2,589,095

VAPOR CONTROL SYSTEM FOR
STORAGE TANKS

Clarence D. Laidley, Tulsa, Okla.

Application October 20, 1949, Serial No. 122,484

3 Claims. (Cl. 220—85)

1

The invention relates to vapor controlling and saving means for a plurality of oil storage tanks and in connection with vent and pressure lines leading from the tanks to a stack, and has for its object to provide, in connection with the tanks and vacuum and pressure relieving line means whereby there will not be a loss of vapor from the other storage tanks when any one of the tanks is opened for sampling purposes, or for emptying. Also to provide means whereby the emptied tank will be maintained cut off from the pressure and vacuum relief line until the tank is again filled and the pressure built up, and at which time it will actuate mechanism whereby all of the tanks will be in pressure communication with the vacuum and pressure line so the pressures in the tanks will be equalized.

A further object is to provide means whereby, when one of the tanks is opened or emptied it will be automatically cut off from the line, thereby preventing robbing of the pressures and vapors in the other tanks, thereby reducing the quality of the products in the robbed tanks.

A further object is to provide a vacuum and pressure relief line in connection with a plurality of tanks, and pressure controlled normally open valves in the line and controlled by the pressures in the individual tanks, and means whereby, when any one of the tanks is opened or emptied, reducing the pressure in the opened or emptied tank, it will be automatically cut off from the line, thereby maintaining the vapors and pressure in the other tanks.

A further object is to provide a venting arrangement in connection with a plurality of storage tanks whereby the minimum amount of vapor loss is maintained in any of the tanks when any one tank is opened for various purposes.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a vertical transverse sectional view through a plurality of tanks and longitudinally through the vacuum and pressure relief line in connection therewith.

Figure 2 is a section through the hatch and portion of the tank, showing a modified form of pressure balance pipe used in connection with the relief valve shown in Figure 4.

2

Figure 3 is an enlarged transverse sectional view through one of the relief valves.

Figure 4 is a view similar to Figure 3 showing the modified form of valve as used in Figure 2.

Referring to the drawings, the numerals 1 and 2 designate oil storage tanks. Two tanks are shown, however it is to be understood that applicant does not limit himself to any number of tanks, and two are shown for illustrative purposes only.

Tanks 1 and 2 are provided with conventional hatches 3 having hinged closures 4, which closures are opened from time to time for sampling purposes, and during a pumping operation when a particular tank is being emptied. Tanks 1 and 2 are connected together by a vacuum and pressure relief line 5, and which line, beyond the end tank, is provided with a conventional form of vacuum and pressure relief stack valve 6, which valve opens when there is an excess of pressure in the various tanks, or vacuum, which has to be relieved. Pipe 5, beyond the valve 6, terminates in a conventional form of stack 7 which discharges into the atmosphere in the usual manner.

Extending upwardly from the top of each tank is a diaphragm valve casing 8, and the casings 8 are connected in the relief line 5. Diaphragm casing 8 has clamped in the upper portion of the chamber thereof flexible diaphragms 9, and this applies to each casing. Clamped on the diaphragms 9, by means of clamping plates 10, are downwardly extending valve stems 11, the lower ends terminating in disc valves 12, which cooperate with the valve seats 13 on the under sides of the seat bushings 14. The lower ends of the stems 11 are preferably guided in guide bushings 15 so there will be an accurate guiding of the valves 12 to closed and open positions. The valve casings 8 have their upper chambers above the diaphragms 9 connected to the chamber 16 of the hatches 3 by by-pass pipes 17, so the pressures from within any one tank, when the hatches are closed, will be equalized above and below the diaphragms 9, consequently all of the valves 12 will be opened as shown in connection with tank 1, consequently excess vapors and pressures below a predetermined amount, according to the setting of valve 6, will equalize throughout all tanks, hence the vapors will not be lost through the stack. It will be noted, if any particular tank draw a normal vacuum, the valve 12 of that particular tank will not be closed.

Referring to Figure 1, the above operation will be obvious.

Immediately upon the opening of the hatch 4 in tank 2, which is to be emptied or opened for sampling purposes, the pressure above the diaphragm 9 is relieved to the atmosphere, consequently the pressure from the tank 1 will close the valve 12 on the tank 2, therefore vapors from the tank 1 will not be lost, nor the quality of the oil reduced. After the tank 2 is emptied its valve 12 will remain closed until the tank 2 is again filled and pressure built up therein, and at which time, with the hatch 4 closed, the pressure will pass through the by-pass pipe 17 and will force the diaphragm 9 downwardly, unseating the valve 12 when the pressure in the tank reaches the pressure in the pressure relief line 5, therefore it will be seen that there is not an unnecessary loss of vapor to the tank 2 at any time during the refilling.

Referring to Figures 2 and 4, which show a modified form of diaphragm valve arrangement, instead of the by-pass pipe 17 being outside, the valve stem 11 is provided with a longitudinal port 18 in communication with the chamber of the casing 8 above the diaphragm 9, and connected to the lower end of the valve stem 11 is a flexible by-pass pipe 17a, disposed within the tank and has its discharge end supported at 19 within the hatch 3. In this form the operation is the same as in Figure 1, however it places the by-pass pipe within the tank, rather than above.

The upper sides of the casing 8 have threaded therein transparent threaded members 20 formed of a plastic and slidably mounted in the chamber 21 thereof are pistons 22 having depending shafts 23 in the path of the diaphragms and valve stems 11. When the diaphragms are up and the valves 12 closed the operator can ascertain which valves are closed, hence an accurate watch can be kept on the conditions of the tanks.

From the above it will be seen that a venting system is provided for a plurality of oil storage tanks wherein the pressures and vapors within the tanks will equalize themselves, and one wherein the tanks are automatically cut off from any particular tank when that tank is opened or emptied, and this cut off will be maintained until the opened tank is refilled, or pressure built up therein to equal the pressure of the pressure relief lines.

The invention having been set forth what is claimed as new and useful is:

1. The combination with a plurality of oil storage tanks having a vacuum and pressure relief line connecting all the tanks, one end of the line leading to a stack, said line having a vacuum and pressure stack valve at the stack end thereof, said tanks having hatches and closures therefor, of means for cutting off flow from the tanks to the vacuum and relief line when any of the hatches are opened and re-establishing communication between the tanks and the relief line when the hatches are closed, said means comprising valve casings carried by the relief line and connected to the tanks, diaphragm control valves within the valve casings, said diaphragm control valves comprising diaphrams within the upper ends of the casings above the relief line and below a pressure chamber above the diaphragm, downwardly extending valve stems carried by the diaphragms and extending through valve seats within the casings, valves carried by the lower ends of the valve stems below the seats and cooperating with the seats upon upward movement of the diaphragms for cutting off communication from the interior of the tanks to the relief line upon reduction of pressure in the diaphragm chambers above the diaphragms and conduit connections between the chambers above the diaphragms and the hatch chambers, said connections forming means whereby the valve of any tank that is open will be automatically closed upon opening of its hatch cover.

2. A device as set forth in claim 1 wherein the connections between the chambers above the diaphragms and the hatches comprise pipes through which the pressure above the diaphragms is built up when the hatch covers are closed for unseating the valves and exhausted from the chambers upon opening of the hatch covers for seating the valves.

3. A device as set forth in claim 1 wherein the connections between the chambers above the diaphragms and the hatches comprises a pressure passage through the valve stem and a flexible pipe connected to the lower end of the valve stem within the tank and terminating in open ends within the hatches.

CLARENCE D. LAIDLEY

REFERENCES CITED

The following references are of record in the file of this patent:

UNITED STATES PATENTS

| Number | Name | Date |
|---|---|---|
| 1,701,870 | Conrader | Feb. 12, 1929 |
| 2,169,411 | Drane | Aug. 15, 1939 |